US011928126B1

(12) United States Patent
Guttula et al.

(10) Patent No.: US 11,928,126 B1
(45) Date of Patent: Mar. 12, 2024

(54) DATA TRANSFORMATION METHODOLOGY USING GENERATED PROGRAM CODE AND TOKEN MAPPINGS

(71) Applicant: International Business Machines Corporation, Armonk, NY (US)

(72) Inventors: Shanmukha Chaitanya Guttula, Vijayawada (IN); Pranay Kumar Lohia, Bhagalpur (IN); Nitin Gupta, Saharanpur (IN); Hima Patel, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/821,309

(22) Filed: Aug. 22, 2022

(51) Int. Cl.
*G06F 16/25* (2019.01)
*G06F 16/84* (2019.01)

(52) U.S. Cl.
CPC ............ *G06F 16/258* (2019.01); *G06F 16/86* (2019.01)

(58) Field of Classification Search
CPC .............................. G06F 16/258; G06F 16/86
See application file for complete search history.

(56) References Cited

U.S. PATENT DOCUMENTS

| | | | |
|---|---|---|---|
| 2011/0038531 A1* | 2/2011 | Arasu .................... | G06F 40/279 382/209 |
| 2018/0081954 A1* | 3/2018 | He ......................... | G06F 16/245 |
| 2019/0171422 A1 | 6/2019 | Udupa et al. | |
| 2021/0011926 A1 | 1/2021 | He et al. | |

FOREIGN PATENT DOCUMENTS

CN 110633084 A 12/2019

OTHER PUBLICATIONS

M. Pham, C. A. Knoblock and J. Pujara, "Learning Data Transformations with Minimal User Effort," 2019 IEEE International Conference on Big Data (Big Data), Los Angeles, Ca, USA, 2019, pp. 657-664, doi: 10.1109/BigData47090.2019.9006350. (Year: 2019).*
Arasu et al., Learning String Transformations From Examples, VLDB '09, Aug. 24-28, 2009, Lyon, France, pp. 514-525 (Year: 2009).*

(Continued)

*Primary Examiner* — Cheyne D Ly
(74) *Attorney, Agent, or Firm* — Yee & Associates, P.C.

(57) ABSTRACT

A computer implemented method transforms data. Responsive to receiving a data transformation of an input string to an output string, a computer system identifies mappable tokens in the input string that are mappable to the output string. The computer system creates a set of initial mappings for a set of common tokens in the mappable tokens. The set of initial mappings maps the set of common tokens from the input string to the output string. The computer system creates a set of user mappings that maps the mappable tokens from input string to the output string using a user input to the set of initial mappings. The computer system generates program code that transform input strings to output strings using the set of user mappings that maps the mappable tokens from input string to the output string, wherein the program code is used to transform input strings to output strings.

9 Claims, 11 Drawing Sheets

(56) References Cited

OTHER PUBLICATIONS

Singh et al. Learning Semantic String Transformations from Examples, Aug. 27-31, 2012, Istanbul, Turkey. Proceedings of the VLDB Endowment, vol. 5, No. 8 (Year: 2012).*

Guo et al., Proactive Wrangling: Mixed-Initiative End-User Programming of Data Transformation Scripts, UIST'11, Oct. 16-19, 2011, Santa Barbara, CA, USA, pp. 65-74. (Year: 2011).*

Singh et al. Transforming Spreadsheet Data Types using Examples, POPL'16, Jan. 20-22, 2016, St. Petersburg, FL, USA, pp. 343-356 (Year: 2016).*

He et al. Transform Data by Example (TDE): An Extensible Search Engine for Data Transformations, Proceedings of the VLDB Endowment, vol. 11, No. 10, pp. 1165-1177. (Year: 2018).*

Gulwani et al., "Spreadsheet data manipulation using examples," Communications of the ACM, vol. 55, No. 8, Aug. 2012, pp. 97-105.

Harris et al., "Spreadsheet Table Transformations From Examples," ACM SIGPLAN Notices, vol. 46, No. 6, Jun. 2011, pp. 317-328.

He et al., "Transform-Data-by-Example (TDE): Extensible Data Transformation in Excel," SIGMOD '18: Proceedings of the 2018 International Conference on Management of Data, May 2018, pp. 1785-1788.

Jin et al., "Foofah: Transforming Data By Example," SIGMOD '17: Proceedings of the 2017 ACM International Conference on Management Data, May 9, 2017, pp. 683-698.

Yan et al., "Auto-Suggest: Learning-to-Recommend Data Preparation Steps Using Data Science Notebooks," SIGMOD '20: Proceedings of the 2020 ACM SIGMOD International Conference on Management of Data, Jun. 2020, pp. 1539-1554, 16 pages.

* cited by examiner

DATA TRANSFORMATION METHODOLOGY USING GENERATED PROGRAM CODE AND TOKEN MAPPINGS

BACKGROUND

1. Field

The disclosure relates generally to an improved computer system and more specifically to a computer implemented method, apparatus, system, and computer program product for generating software to transform input strings into output strings.

2. Description of the Related Art

Data transformation involves converting data from one format or structure into another format or structure. Data transformations can be used in various data management tasks. For example, data transformation tasks can be performed from moving all of the data in a database to another database.

Data transformation can be simple or complex depending on the changes of the data from a source data to a target data. In generating data transformation programs, data discovery is performed to identify the structure and characteristics of the data to be transformed. The discovery can be performed using profiling tools. Data mapping is performed to define how fields in the source data are to be mapped, modified, joined, filtered, aggregated, or otherwise handled to produce fields for the target data.

Based on this information, executable code is generated to perform the transformation of data from the source data to the target data. Machine learning models can be trained to perform data transformations. Training data in the form of historical transformations from source data to target data can be used to train the machine learning model to perform the data transformations.

SUMMARY

According to one illustrative embodiment, a computer implemented method transforms data. Responsive to receiving a data transformation of an input string to an output string, a computer system identifies mappable tokens in the input string that are mappable to the output string. The computer system creates a set of initial mappings for a set of common tokens in the mappable tokens. The set of initial mappings maps the set of common tokens from the input string to the output string. The computer system creates a set of user mappings that maps the mappable tokens from input string to the output string using a user input to the set of initial mappings. The computer system generates program code that transform input strings to output strings using the set of user mappings that maps the mappable tokens from input string to the output string, wherein the program code is used to transform input strings to output strings. According to other illustrative embodiments, a computer system and a computer program product for transforming data are provided.

DETAILED DESCRIPTION

Figure 1:
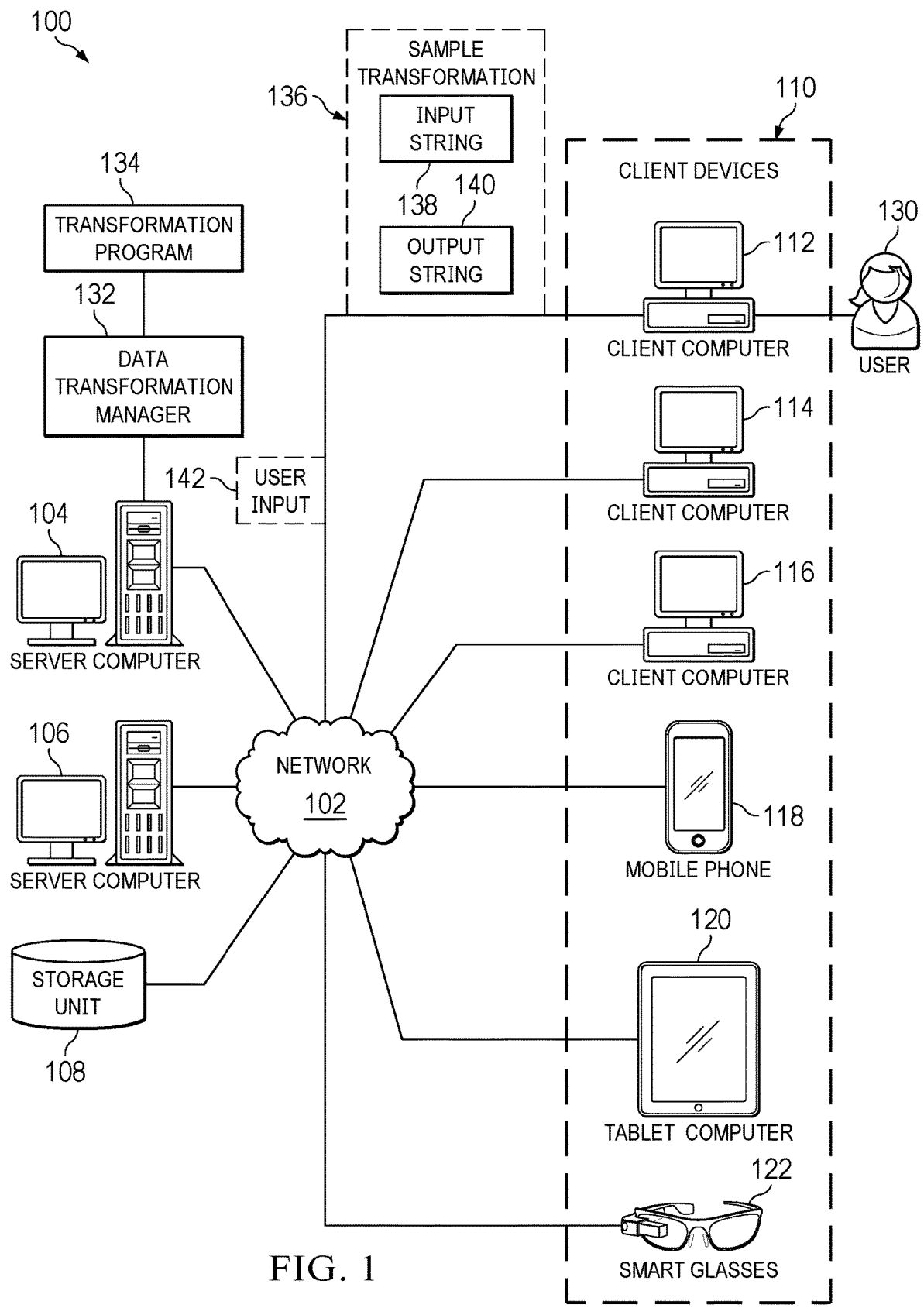
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations as described herein. For example, many types of data transformation programs are available for transforming data from a source data to a target data. Selecting an appropriate set of data transformation programs for performing data transformation can be challenging. As used herein, a "set of" when used with reference items means one or more items. For example, the set of data transformation programs is one or more data transformation programs.

A generalizable program such as a machine learning model can be trained to perform data transformations. Challenges, however, are present with machine learning models. For example, selecting a training data set that provides desirable accuracy data transformations can be challenging. Accuracy in performing data transformations from input data to output data can be increased by selecting multiple diverse examples. No guarantees are present that the provided input and output samples of data transformation will be sufficient for the machine learning model to perform data transformations with a desired level of accuracy.

Further, understanding why the system is generating specific transformations cannot be understood with machine learning models. For a user to generate program code to perform data transformations, an understanding of the underlying programming language, characteristics of the data, and other factors are needed. With the inability to be aware of analysis or process performed by machine learning model, performing additional training to increase accuracy can be difficult. As result, users may generate training data with more and more diverse examples, which can be challenging.

Thus, the illustrative embodiments recognize and take account that it would be desirable to have a system for generating program code to transform input data to output data in which the number of examples can be reduced. For example, it would be desirable to be able to use a single sample to capture the intent of the data transformation to be performed. In the different illustrative examples, user input is requested and received during the program generation process. This involvement of the user can also increase user awareness of how the final data transformation program operates.

In one illustrative example, and computer implemented method transforms data. In response to receiving a data transformation of an input string to an output string, a computer system identifies mappable tokens in the input string that are mappable to the output string. The computer system creates a set of initial mappings for a set of common tokens in the mappable tokens. The set of initial mappings maps the set of common tokens from the input string to the output string. The computer system creates a set of user mappings that maps the mappable tokens from input string to the output string using a user input to set of initial mappings. Program code is generated by the computer system in which the program code transforms input strings to output strings using the set of user mappings that maps the mappable tokens from input string to the output string, wherein the program code is used to transform input strings to output strings.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 130 at client computer 112 can use data transformation manager 132 located in server computer 104 to create transformation program 134 that operates to transform input data into output data. In this illustrative example, transformation program 134 is program code that can be in the form of a JSONata transformation program. In this example, JSONata is a lightweight query and transformation language for JavaScript Object Notation (JSON) data In this illustrative example, user 130 sends sample transformation 136 as a user input to data transformation manager 132. Sample transformation 136 is a single example of a data transformation and comprises input string 138 and output string 140 resulting from the data transformation of input string 138.

In response to receiving sample transformation 136, data transformation manager 132 generates transformation program 134 as part of the guided program generation process in which user 130 provides input during this process of creating transformation program 134. In this process, data transformation manager 132 begins by identifying mappable tokens within input string 138 and output string 140. A token is a part or portion of a string. For example, if the string is "He is leaving at 2 pm", the tokens can be "He", "is", "leaving", "at", "2", and "pm".

Data transformation manager 132 looks for common tokens in the mappable tokens that can be mapped with a desired level of confidence. For example, the desired level of confidence can be an exact match between a common token that is in both input string 138 and output string 140. This automatic mapping may result in some mappable tokens not having a mapping at this point. In other words, the common tokens can be a subset of the mappable tokens.

In this illustrative example, data transformation manager 132 obtains user input 142 from user 130. Data transformation manager 132 can send the mappings determined through automatic mapping over network 102 from server computer 104 to client computer 112 for display to user 130. In response, user 130 can generate user input 142 which is sent from client computer 112 back to data transformation manager 132 in server computer 104 over network 102.

User input 142 is feedback regarding the mappings identified by data transformation manager 132. This feedback may include confirming modifications to one or more of the mappings made by data transformation manager. The modifications can include changing a mapping, adding a mapping, and removing a mapping from the mappings made by data transformation manager 132.

Data transformation manager 132 can also identify token properties for mapped tokens. The initiation of token properties can be identified for each mapping present in response to user input 142 providing feedback about the mappings generated by data transformation manager 132. Further, data transformation manager 132 can also receive user input 142 from user 130 that provides feedback about the token properties. In this example, user input 142 can also be returned to confirm or make modifications to token properties for mapped tokens that have been confirmed or modified by user 130.

Data transformation manager one generates transformation program 134 using the token mappings and token properties. In this example, the program code in transformation program 134 includes program code for each mapping using the token properties identified in the process involving the user 130. The collective program code for each of the mappings forms transformation program 134 that performs a data transformation of input string 138 to output string 140. With user input 142 from user 130, transformation program 134 can also perform transformations of other input strings to output strings in the pattern of transformations performed by transformation program 134 with a higher level of accuracy as compared to other techniques using a single sample transformation.

Figure 2:
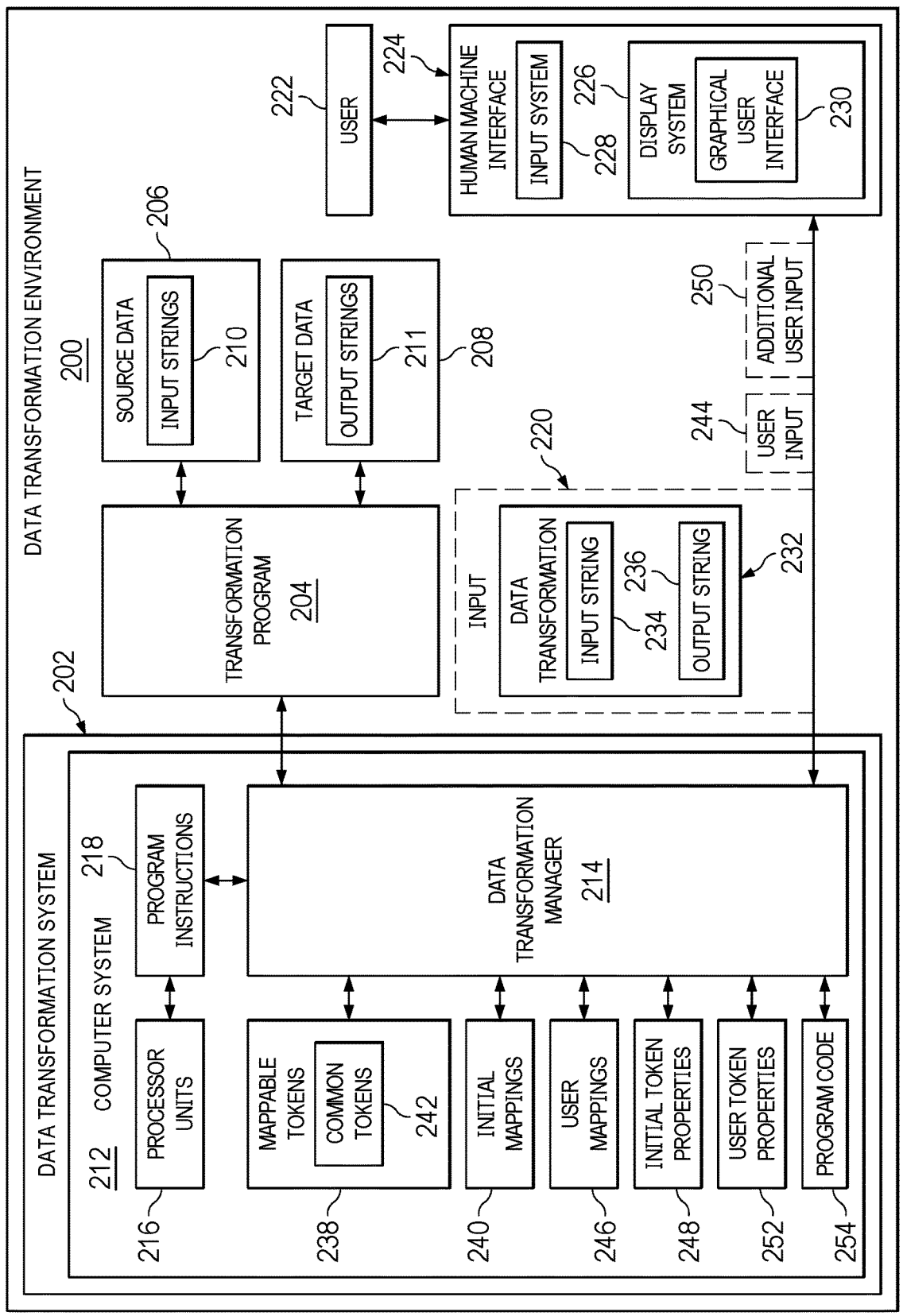
FIG. 2 is a block diagram of a data transformation environment in accordance with an illustrative embodiment.

With reference now to FIG. 2, a block diagram of a data transformation environment is depicted in accordance with an illustrative embodiment. In this illustrative example, data transformation environment 200 includes components that can be implemented in hardware such as the hardware shown in network data processing system 100 in FIG. 1.

Data transformation system 202 can operate to create transformation program 204 to perform data transformation of source data 206 to target data 208. As depicted source data 206 comprises input string 210. Target data 208 comprises output string 211 generated from transforming input string 210.

In this illustrative example, data transformation system 202 comprises computer system 212 and data transformation manager 214. Data transformation manager 214 is located in computer system 212.

Data transformation manager 214 can be implemented in software, hardware, firmware or a combination thereof. When software is used, the operations performed by data transformation manager 214 can be implemented in program instructions configured to run on hardware, such as a processor unit. When firmware is used, the operations performed by data transformation manager 214 can be implemented in program instructions and data and stored in persistent memory to run on a processor unit. When hardware is employed, the hardware can include circuits that operate to perform the operations in data transformation manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. As used herein a processor unit in the number of processor units 216 is a hardware device and is comprised of hardware circuits such as those on an integrated circuit that respond and process instructions and program instructions that operate a computer. When a number of processor units 216 execute program instructions 218 for a process, the number of processor units 216 is one or more processor units that can be on the same computer or on different computers. In other words, the process can be distributed between processor units on the same or different computers in a computer system. Further, the number of processor units 216 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this example, data transformation manager 214 receives input 220 from user 222 at human machine interface 224. As depicted, human machine interface 224 comprises display system 226 and input system 228.

Display system 226 is a physical hardware system and includes one or more display devices on which graphical user interface 230 can be displayed. The display devices can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information. User 222 is a person that can interact with graphical user interface 230 through user input generated by input system 228. Input system 228 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, or some other suitable type of input device.

As depicted, input 220 takes the form of data transformation 232 of input string 234 to output string 236. In other words, data transformation 232 is illustrated by input string 234 and output string 236 occurring from the transformation of input string 234. In response to receiving this data transformation, data transformation manager 214 identifies mappable tokens 238 in input string 234 and output string 236 in data transformation 232. In this illustrative example, mappable tokens 238 are identified in input string 234 and output string 236. These mappable tokens are parts of input string 234 and output string 236. For example, a mappable token can be a character, a word, a phrase, or some other part of a string.

Data transformation manager 214 creates a set of initial mappings 240 for a set of common tokens 242 in mappable tokens 238. As used herein, a "set of" when used with reference items means one or more items. For example, a set of initial mappings 240 is one or more of initial mappings 240.

In this illustrative example, the set of initial mappings 240 maps the set of common tokens 242 from input string 234 to output string 236. The set of common tokens 242 are mappable tokens 238 that can be mapped between input string 234 and output string 236. The set of common tokens 242 can be a subset of mappable tokens 238. For example, an initial mapping in the set of initial mappings 240 maps a common token in input string 234 to a common token in output string 236.

Data transformation manager 214 identifies mappable tokens 238 in input string 234 that are mappable to output string 236. In this illustrative example, data transformation manager 214 can display the set of initial mappings 240 in graphical user interface 230 to user 222. In response to seeing this visualization of the set of initial mappings 240, user 222 can generate user input 244 to the set of initial mappings 240.

In this illustrative example, user input 244 to the set of initial mappings 240 is selected from one of a confirmation of the set of initial mappings 240 and a modification to the set of initial mappings 240. The modification to the set of initial mappings, for example, can be adding a mapping for a mappable token in input string 234 to a mappable token in output string 236, changing a mapping between the mappable token in input string 234 and a mappable token in output string 236, or remove a mapping between a mappable token in input string 234 and output string 236.

As depicted, data transformation manager 214 receives user input 244 to the set of initial mappings 240. Data transformation manager 214 can create a set of user mappings 246 that map mappable tokens 238 from input string 234 to output string 236 using user input 244 to set of initial mappings 240. In this illustrative example, the set of user mappings 246 can indicate a mapping between the mappable token in input string 234 and the mappable token in output string 236. In some cases, the mapping may be that no mapping is present between a mappable token in input string 234 and a mappable token in output string 236. In other words, the set of user mappings 246 can include an absence of a mapping from one mappable token in input string 234 to another mappable token in output string 236.

In this illustrative example, data transformation manager 214 can also identify a set of initial token properties 248 for the mappable tokens 238 in the set of user mappings 246. A token property for a mappable token identifies a property of the mappable token. For example, the token property for a mappable token can be the token type, a number of characters, or some other property. The token type can be, for example, an integer, decimal, binary, octal, character, or other type of token.

Data transformation manager 214 can display the set of initial token properties 248 to user 222 in graphical user interface 230 on display system 226. User 222 can provide additional user input 250 to the set of initial token properties 248. In this illustrative example, the additional user input 250 to the set of initial token properties 248 can be selected from one of confirmation of the set of initial token properties 248 and a modification to the set of initial token properties 248. In this illustrative example, the modification can be to add a token property, remove a token property, or change a token property for a mappable token having a user mappings in the set of user mappings 246.

Additional user input 250 to the set of initial token properties 248 can be used by data transformation manager 214 to create a set of user token properties 252 for mappable tokens 238 in user mappings 246. In other words, a mappable token having a mapping from an input string to an output string in the set of user mappings 246 has a user token property in the set of user token properties 252.

Data transformation manager 214 can generate program code 254 that transform input strings 210 to output strings 211 using the set of user mappings 246 that maps mappable tokens 238 from input string 234 to output string 236. Data transformation manager 214 also uses the set of user token properties 252 to create program code 254.

Program code 254 forms transformation program 204 and can be used to transform input strings 210 to output strings 211. In other words, program code 254 is not specific to data transformation 232 but can be used to generate a desired pattern of transformations of input strings 210 to output strings 211 using data transformation 232 of input string 234 to output string 236 is an example for creating a process implemented in program code 254 for transformation program 204. As result, program code 254 in transformation program 204 can be used to perform data transformation of input strings 210 to output strings 211.

Thus, one or more illustrative examples can provide transformation of input strings 210 in source data 206 to output strings 211 in target data 208. This transformation is provided in these examples using transformation program 204 that is created with a single example transformation such as data transformation 232. The accuracy of transformations performed using transformation program 204 is increased through user input received from user 222 during the process of generating program code 254 for transformation program 204. As result, generation of transformation program 204 can be performed using less examples as compared to current techniques that involve training machine learning models.

This process enables user 222 to be aware of the manner in which transformations are performed in transformation program 204. This awareness can enable user 222 more knowledgeably select transformation program 204 from other transformation programs generated by data transformation manager 214. In other words, user 222 can have knowledge of how transformation program 204 performs transformations of input strings 210 to output strings 211. With this knowledge, user 222 can more easily select a transformation program generated using data transformation manager 214 to know the intended format of the target data when source data of a particular format is input into a transformation program created using data transformation manager 214. This knowledge about data transformation program 204 can be captured in a repository which mappings and user inputs can be stored for creation of data transformation program 204 and other data transformation programs.

Computer system 212 can be configured to perform at least one of the steps, operations, or actions described in the different illustrative examples using software, hardware, firmware or a combination thereof. As a result, computer system 212 operates as a special purpose computer system in which data transformation manager 214 in computer system 212 enables transferring data using less example transformations with greater accuracy as compared to current techniques. In this illustrative example, data transformation manager 214 transforms computer system 212 into a special purpose computer system as compared to currently available general computer systems that do not have data transformation manager 214. For example, data transformation manager 214 can generate program code 254 for transformation program 204 with less time and steps through using user inputs applied by a user.

In the illustrative example, the use of data transformation manager 214 in computer system 212 integrates processes into a practical application transforming data in a manner that increases the performance of computer system 212. In other words, data transformation manager 214 in computer system 212 is directed to a practical application of processes integrated into data transformation manager 214 in computer system 212 to create transformation program 204 with less time and increased efficiency through using a single transformation example and user input.

The illustration of data transformation environment in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a second or third example can be processed by data transformation manager 214 in addition to the example in data transformation 232 in generating mappings to create transformation program 204. In this illustrative example, transformation program 204 can be located in computer system 212 as part of data transformation system 202 to perform transformations of source data 206 to target data 208.

Figure 3:
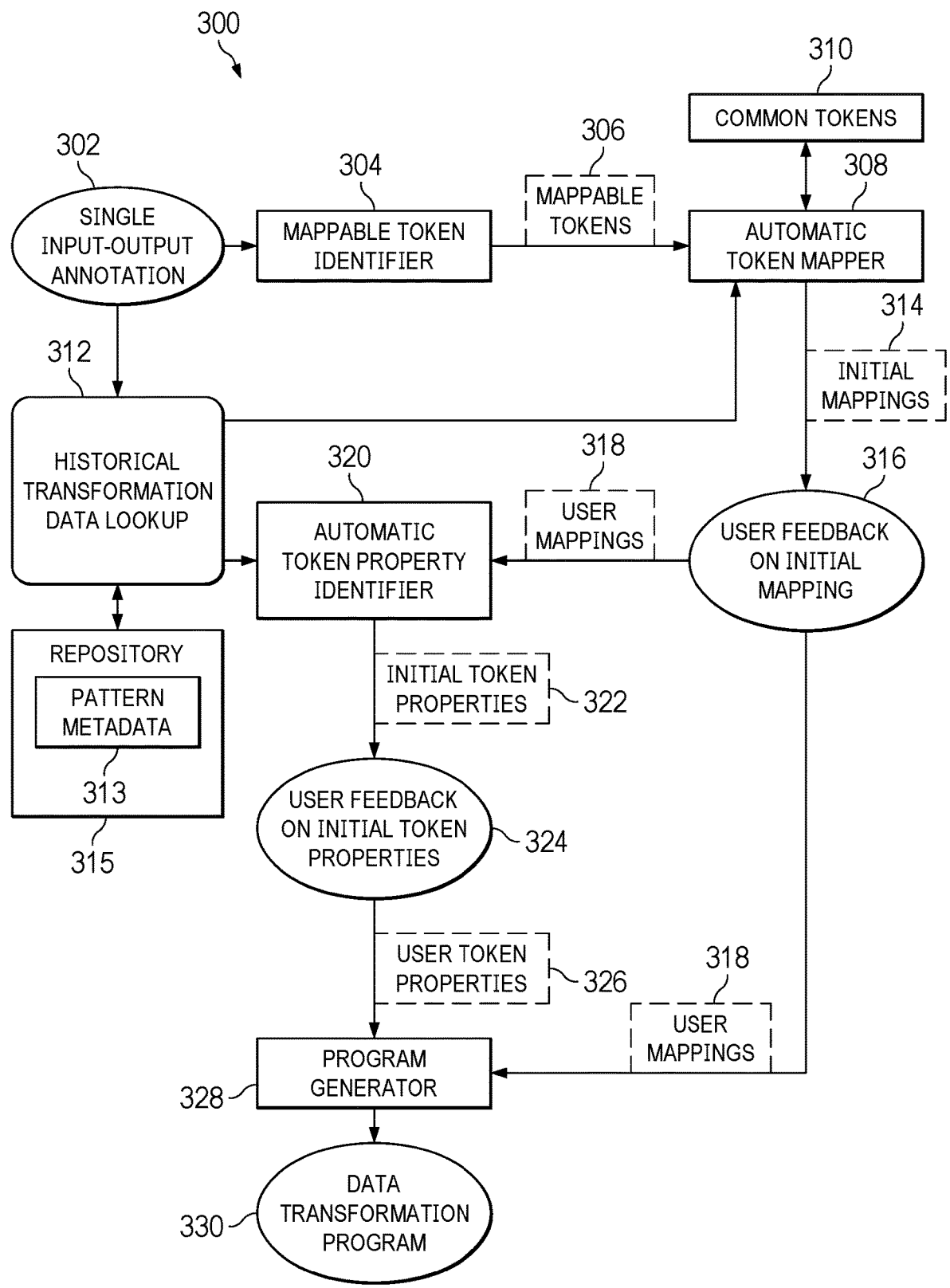
FIG. 3 is a data flow diagram for generating program code for use in transforming data in accordance with an illustrative embodiment.

Turning to FIG. 3, a data flow diagram for generating program code for use in transforming data is depicted in accordance with an illustrative embodiment. The data flow in this diagram can be implemented using data transformation manager 214 in FIG. 2.

In this illustrative example, data flow diagram 300 begins with receiving single input-output annotation 302. In this example, single input-output annotation 302 is an example an input string and the resulting output string that occurs from transforming the input string. Single input-output annotation 302 can be, for example, data transformation 232 in FIG. 2.

As depicted, single input-output annotation 302 is sent to mappable token identifier 304. In response to receiving this annotation, mappable token identifier 304 identifies tokens in the input string that can be mapped to the output string in single input-output annotation 302.

Automatic token mapper 308 receives mappable tokens 306. Automatic token mapper 308 identifies common tokens 310 within mappable tokens 306 that can be mapped with a desired level of confidence from the input string to the output string in single input-output annotation 302. This level of confidence can be, for example, an exact match between the common token in the input string to the common token in the output string in which multiple instances of the common token are not present. In other words, if only a single mapping is possible, then the desired level of confidence can be present. In another illustrative example, if multiple potential mappings are present between tokens, pattern metadata 313 can also be used to predict or identify the best mappable tokens to provide a desired level of confidence.

In this illustrative example, pattern metadata 313 comprises the mapping of tokens and token properties. Pattern metadata 313 can be stored in repository 315. Repository 315 can be, for example, a database, a table, a linked list, or some other type of data structure.

For example, if multiple potential mappings are present between common tokens, a mapping with a desired level of confidence may be identified for one of the potential mappings using historical transformation data lookup 312 to search pattern metadata 313. Thus, historical transformation data lookup 312 can be used to look up historical data of prior data transformations in which the pattern data transformations can be used to determine mappings and token properties for verification by the user.

The desired level of confidence may be present if a mapping is found by historical transformation data lookup 312 for a common token in the input string and output string. The common tokens in the input string and output string can be used by historical transformation data lookup 312 to identify similar patterns of mappings between common tokens and the properties for the common tokens that may match the common tokens in single input-output annotation 302.

With the information about mappings between common tokens, automatic token mapper 308 can generate initial mappings 314 that maps a set of common tokens 310 from the input string to the output string. In this illustrative example, common tokens 310 are mappable tokens 306 that can be mapped in initial mappings 314.

Initial mappings 314 can be displayed to a user in a graphical user interface to obtain user feedback on initial mapping 316. The feedback is a user input that can be a confirmation of initial mappings 314. The feedback can also be a modification of initial mappings 314. This modification received in the feedback from the user can be at least one of adding a mapping, removing a mapping, or changing a mapping in initial mappings 314.

This feedback is used to generate user mappings 318. In this depicted example, user mappings 318 are used by automatic token property identifier 320 to identify initial token properties 322. Automatic token property identifier 320 identifies initial token properties 322 for common tokens 310 that have mappings in user mappings 318. For each mapping, the properties of the tokens in user mappings 318 are identified. The properties can be, for example, the type of token, size, or other properties. This identification can be made using historical mapping patterns and the properties for those mapping patterns identified using historical transformation data lookup 312.

Initial token properties 322 are displayed to the user to obtain user feedback on initial token properties 324. This feedback can be a confirmation or modification of initial token properties 322. The feedback is used to generate user token properties 326.

As depicted, user token properties 326 and user mappings 318 are sent to program generator 328. Program generator 328 uses user token properties 326 and user mappings 318 in which a program code is generated for each mapping using the token property for that map. Data transformation program 330 is a combination of the program code for the different mappings in user mappings 318 using user token properties 326 for those mappings. Data transformation program 330 is an example of transformation program 204 in FIG. 2.

Figure 4:
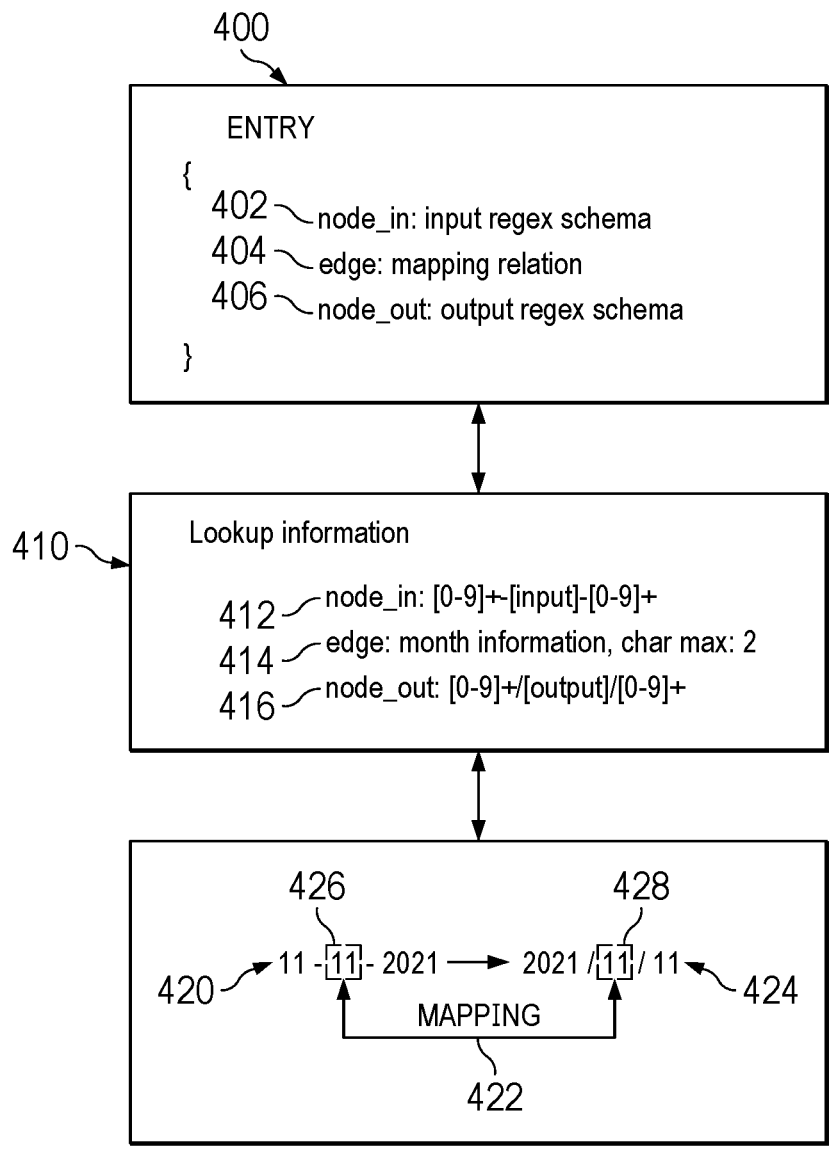
FIG. 4 is an illustration of lookup information for identifying mappings and token properties in accordance with an illustrative embodiment.

Turning next to FIG. 4, an illustration of lookup information for identifying mappings and token properties is depicted in accordance with an illustrative embodiment. In this illustrative example, schema 400 is an example a format for storing lookup information such as pattern metadata describing token mappings and token properties. This lookup information can be searched and returned by historical transformation data lookup 312 for use in identifying mappings of tokens and token properties.

In this illustrative example, schema 400 is an example of a format or schema used in JSON. In this example, regular expressions (regex) are used to represent string patterns. As depicted, schema 400 is an example of a format that can be used to store pattern metadata such as token mappings and token properties. Schema 400 comprises node_in: input regex schema 402, edge: mapping relation 404, and node_out: output regex schema 406. In this example, node_in: input regex schema 402 describes the schema for a token in an input string, and node_out: output regex schema 406 describes the schema for a token in the output. As depicted, edge: mapping relation 404 represents a mapping between the token in the input string and the token in the output string.

As depicted, lookup information 410 is an example of pattern metadata describing a mapping of two tokens and the token properties for those tokens using schema 400. In this example, line 412 describes the token in the input string, line 414 describes the token in the output string. In lookup information 410, the description of the token in line 412 and the description of the token in line 416 describes two tokens mapped to each other. Line 414 is an edge describing the token properties for the two tokens.

In this example, the token in the input string is 1 to 2 characters from 0 to 9 with "-" on either side. The token in the output string is 1 to 2 characters from 0 to 9 with "/" on either side of the 1 to 2 characters. The token properties in this depicted example are token type which is month and the maximum number of characters which is 2 in this example.

In this illustrative example, input string 420 and output string 424 can be analyzed to determine whether a mapping can be made between mappable tokens in these two strings. This identification can be made using pattern metadata in lookup information 410.

As depicted, mapping 422 of token 426 in input string 420 to token 428 in output string 424 matches lookup information 410. In this illustrative example, token 426 and token 428 are common tokens that can be mapped to each other using mapping 422 even though more than one type of mapping of these tokens can be present. Mapping 422 is identified using lookup information 410. In this example, mapping 422 is confirmed as having a sufficient level of confidence based on comparing mapping 422 of token 426 and token 428 with lookup information 410.

Thus, in this example in FIG. 4, pattern metadata about transformations can be stored using schema 400. An example transformation comprising an input string and an output string can be used to search entries such as schema 400 identified matches to node_in, edge, and node_out. Matches between the example transformation and the values for node_in and node_out can be used to identify edges for mappings. Further, matches to entries for node_in, edge, and node_out can be used to identify token properties.

Figure 5:
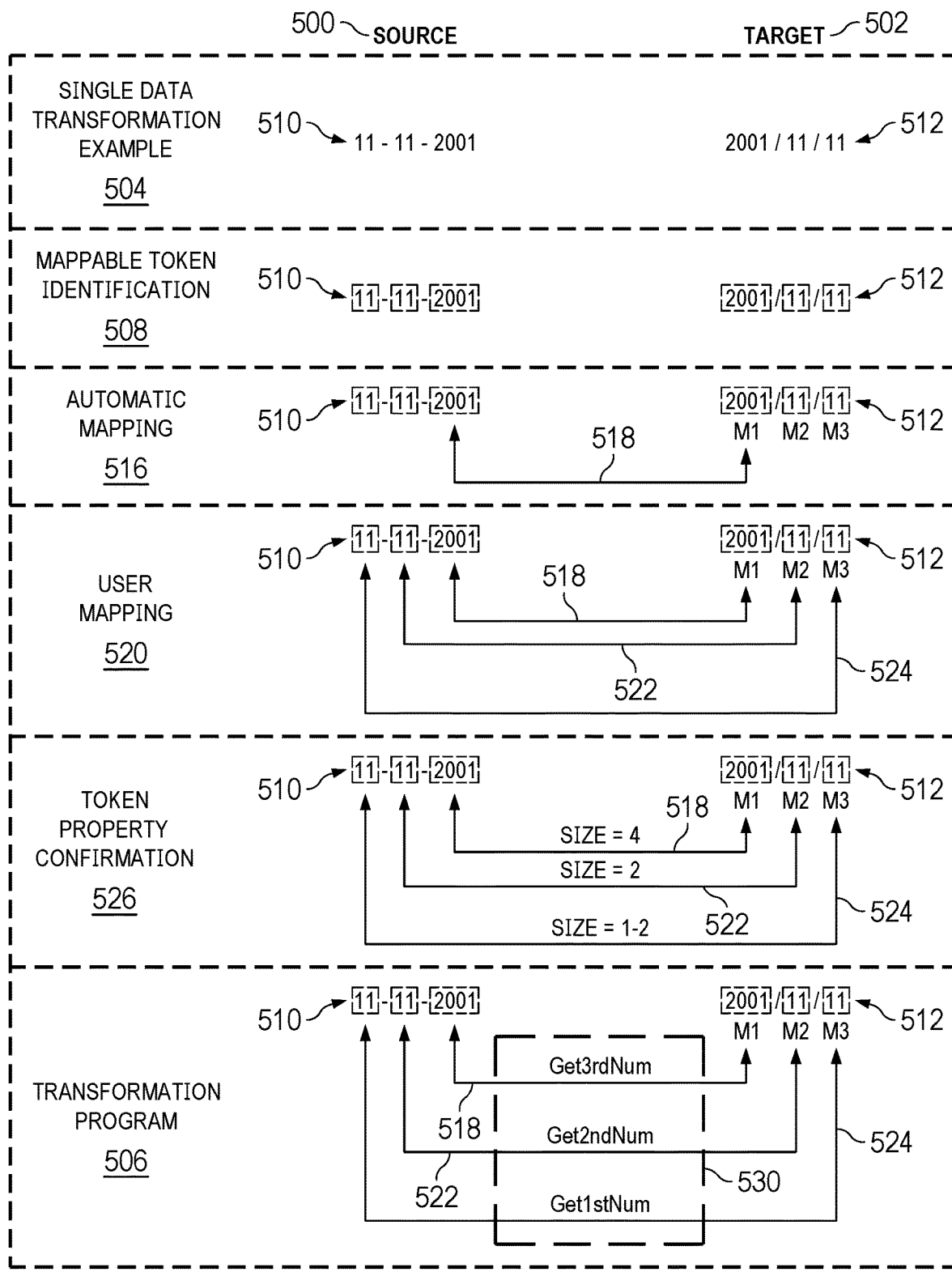
FIG. 5 is an illustration of a process for generating a transformation program to transform input strings to output strings using a data transformation example in accordance with an illustrative embodiment.
Figure 6:
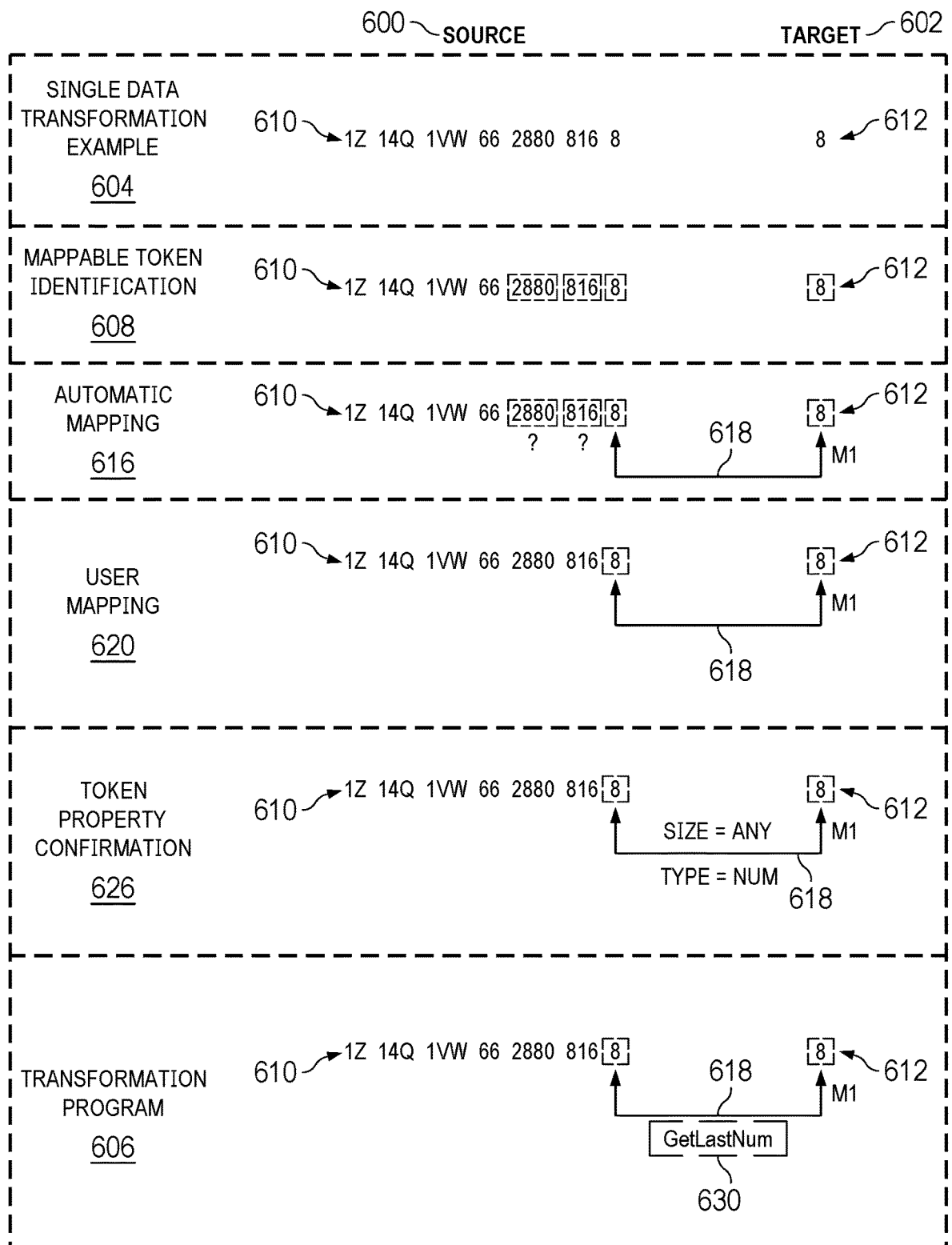
FIG. 6 is an illustration of a process for generating a transformation program to transform input strings to output strings using a data transformation example in accordance with an illustrative embodiment.
Figure 7:
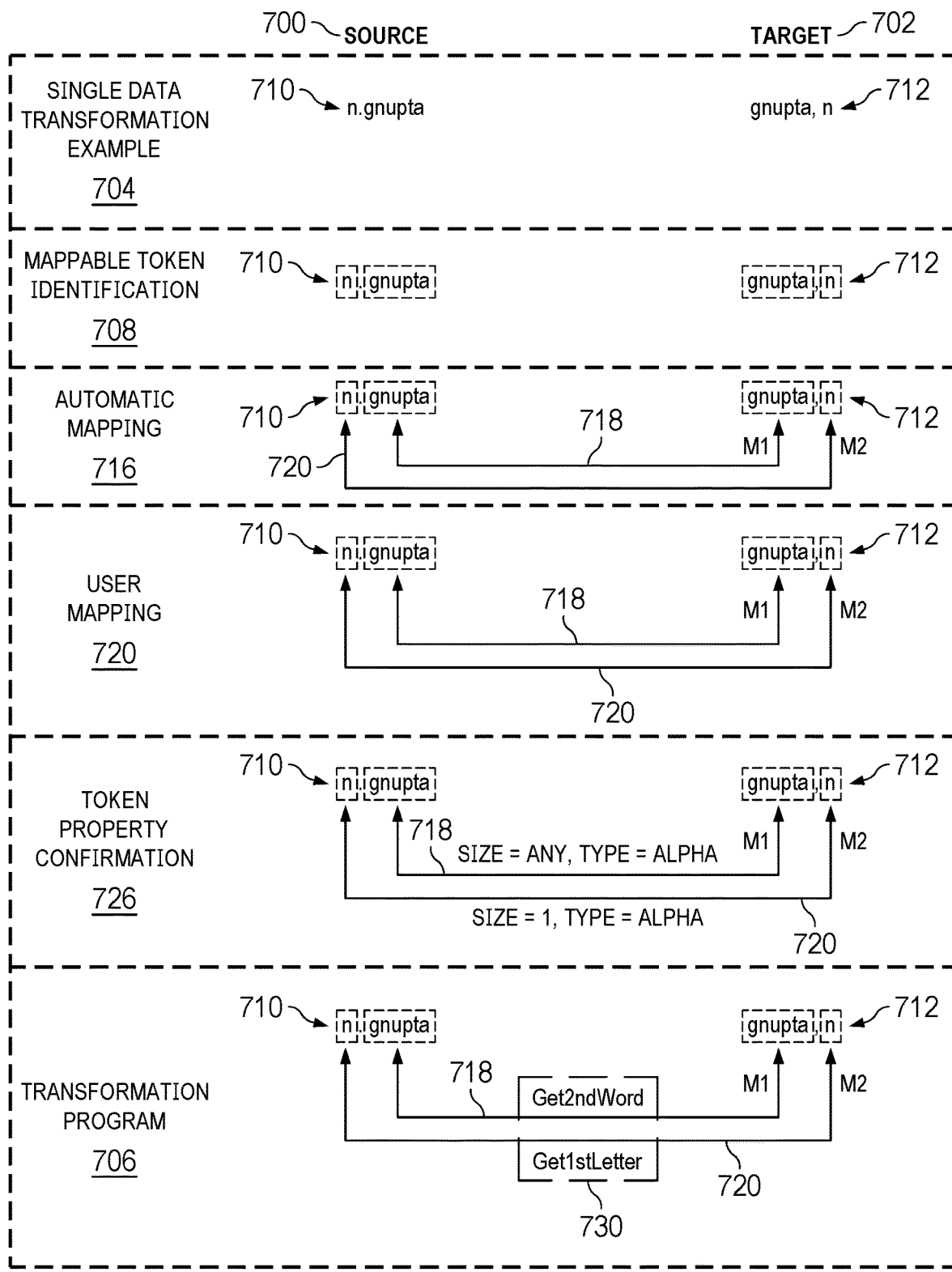
FIG. 7 is an illustration of a process for generating a transformation program to transform input strings to output strings using a data transformation example in accordance with an illustrative embodiment.

With reference to FIGS. 5-7, illustrations of a process for generating the transformation program for mapping source data to target data is depicted in accordance with an illustrative embodiment. In this illustrative example, the source data takes the form of input strings and the target data takes the form of output strings.

Turning first to FIG. 5, an illustration of a process for generating a transformation program to transform input strings to output strings using a data transformation example is depicted in accordance with an illustrative embodiment. Source column 500 and target column 502 take the form of input strings and output strings.

Single data transformation example 504 is received for processing to generate transformation program 506. As depicted, single data transformation example 504 includes input string 510 that comprises "11-11-2001" and output string that comprises "2001/11/11".

In this illustrative example, mappable token identification 508 is performed to identify mappable tokens in input string 510 and output string 512. As depicted, mappable tokens in input string 510 are "11", "11", and "2001" and mappable tokens in output string 512 are "11", "11", and "2001".

Automatic mapping 516 is performed on the mappable tokens to identify common tokens that can be mapped with a desired level of confidence. In this illustrative example, the common tokens are "2001" in input string 510 and "2001" in output string 512. These are the tokens for mapping from mappable tokens identified in mappable token identification 508. In this example, the desired level of confidence is present because only one possible mapping is present between these mappable tokens. Automatic mapping 516 generates mapping M1 518.

User mapping 520 involves displaying the initial mapping generated by automatic mapping 516 to a user on a graphical user interface on a display system for feedback. In this example, the user input received as feedback results in adding mapping M2 522 and M3 524 in response to receiving user input modifying the initial mapping generated by automatic mapping 516 to include two additional mappings.

Token property confirmation 526 results in associating token properties with tokens mapped between input string 510 and output string 512. This confirmation is performed by automatically identifying token properties common tokens that are mapped between input string 510 and output string 512 and then obtaining user input regarding the token properties are defined. In this illustrative example, the token property for mapping 518 M1 is size =4, indicating that the tokens in this mapping have 4 characters. The token properties for mapping M2 522 are size =2, indicating that the tokens in this mapping path have 2 characters. Further, the token properties for mapping M3 524 are size=1–2, indicating that the tokens can have one to two characters.

In transformation program 506, instructions 530 are generated for each of the three mappings, mapping M1 518, mapping M2 522, and mapping M3 524 using the token properties identified. In this example, instructions 530 include Get1stNum, Get2ndNum, and Get3rdNum. These instructions can be examples of program code or can be used to generate program code to perform a transformation of input string 510 to output string 512 with a desired format. This transformation is generalized such that transformations can be performed on other input strings and output strings for which a similar transformation is desired using the instructions based on user input on the mappings and token properties. In this example, the user can understand what types of source and target data can be transformed because the user has information on the mappings for the transformations that are performed.

Turning to FIG. 6, an illustration of a process for generating a transformation program to transform input strings to output strings using a data transformation example is depicted in accordance with an illustrative embodiment. Source column 600 and target column 602 take the form of input strings and output strings.

Single data transformation example 604 is received for processing to generate transformation program 606. As depicted, single data transformation example 604 includes input string 610 that comprises "1Z 14Q 1VW 66 2880 816 8" and output string 612 that comprises "8".

In this illustrative example, mappable token identification 608 is performed to identify mappable tokens in input string 610 and output string 612. As depicted, mappable tokens in input string 610 are "2880", "816", and "8", and the mappable token in output string 612 is "8".

Automatic mapping 616 is performed on the mappable tokens to identify common tokens that can be mapped with a desired level of confidence. In this illustrative example, the common tokens are "8" in input string 610 and "8" in output string 612. Automatic mapping 616 generates mapping M1 618.

User mapping 620 displays the initial mapping generated by automatic mapping 616 to a user on a graphical user interface for feedback. In this example, the user input received as feedback. User mapping 620 results are a result of the confirmation of the initial mapping generated by automatic mapping 616. Token property confirmation 626 results in associating token properties with the tokens mapped between input string 610 and output string 612. In this illustrative example, the token property for the tokens in mapping 618 M1 is size=any and type=any.

In transformation program 606, instructions 630 are generated for mapping M1 618. Instructions 630 is "GetLastNum". This instruction can be an example of program code or can be used to generate program code to perform a transformation of input string 610 to output string 612. Transformation program 606 can be used to transform other input and output strings for which a similar transformation pattern is desired to transform the input strings into output strings with a desired format.

In FIG. 7, an illustration of a process for generating a transformation program to transform input strings to output strings using a data transformation example is depicted in accordance with an illustrative embodiment. Source column 700 and target column 702 take the form of input string and output strings.

Single data transformation example 704 is received for processing to generate transformation program 706. As depicted, single data transformation example 704 includes input string 710 that comprises "n.gnupta" and output string 712 that comprises "gnupta, n".

In this illustrative example, mappable token identification 708 is performed to identify mappable tokens in input string 710 and output string 712. As depicted, mappable tokens in input string 710 are "n" and "gnupta", and mappable tokens in output string 712 are "gnupta" and "n".

Automatic mapping 716 is performed on the mappable tokens to identify common tokens that can be mapped with a desired level of confidence. In this illustrative example, the common tokens are "n" and "gnupta" in input string 710 and "gnupta" and "n" in output string 712. Automatic mapping 716 generates mapping M1 718 and mapping M2 720.

User mapping 720 is a result of the confirmation of the initial mapping generated by automatic mapping 716. In this illustrative example, user mapping 720 receives user input that confirms the initial mapping generated by automatic mapping 716. Token property confirmation 726 results in associating token properties with the tokens mapped between input string 710 and output string 712. In this illustrative example, the token properties for the tokens in mapping M1 718 are size=any and type =Alpha. The token properties for the tokens in mapping M2 720 are size=any and type =Alpha.

In transformation program 706, instructions 730 are generated for mapping M1 718 and mapping M2 720. Instructions 730 comprises "Get2ndWord" and "Get1stLetter." These instructions can be an example of program code or can be used to generate program code to perform a transformation of input string 710 to output string 712. Transformation program 706 can be used to transform other input and output strings for which a similar transformation pattern is desired to transform the input strings into output strings with a desired format.

Figure 8:
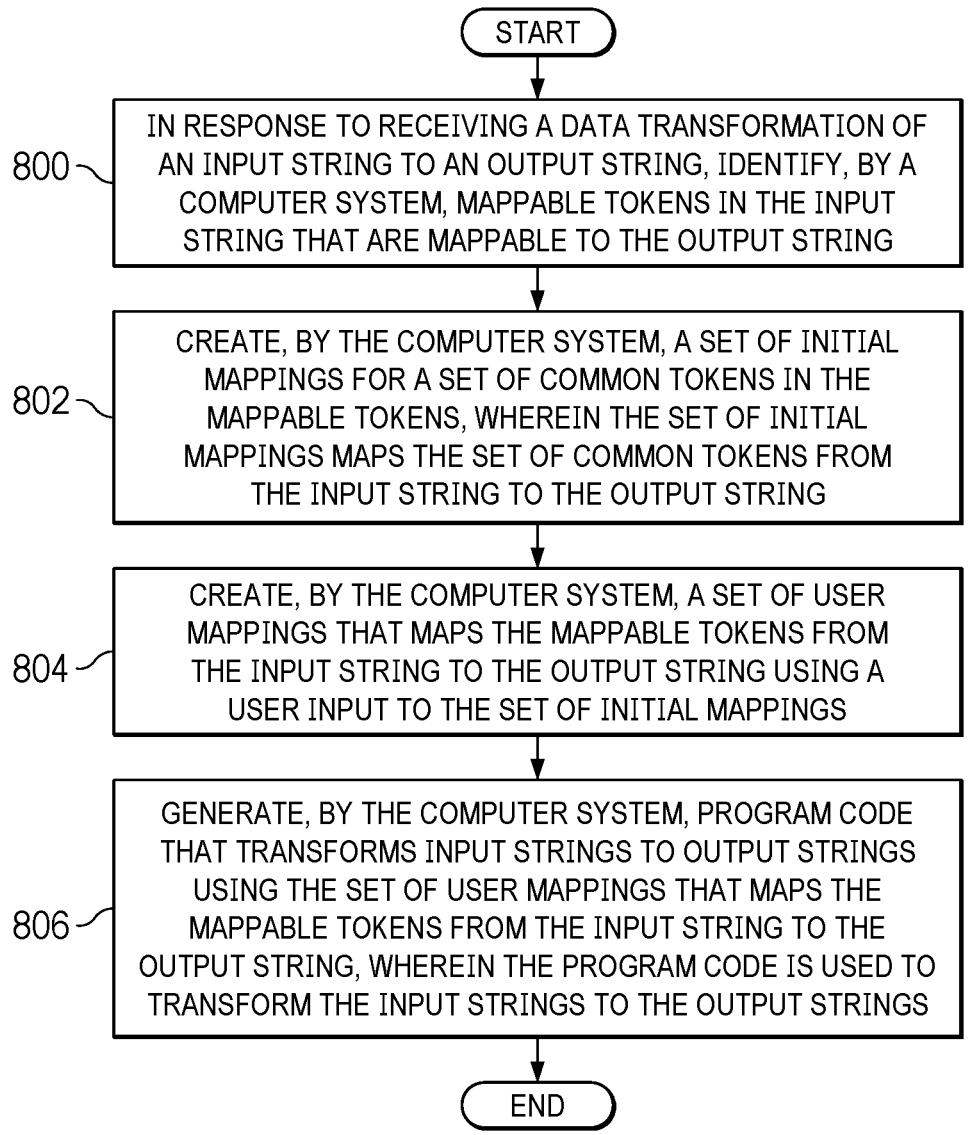
FIG. 8 is a flowchart of a process for transforming input strings to output strings using a set of user mappings in accordance with an illustrative embodiment.

With reference to FIG. 8, a flowchart of a process for transforming input strings to output strings using a set of user mappings is depicted in accordance with an illustrative embodiment. The process illustrated in FIG. 8 can be implemented using computer system 212 in FIG. 2. For example, the process can be implemented in data transformation manager 214 in computer system 212 in FIG. 2.

The process begins in response to receiving a data transformation of an input string to an output string, identifying, by a computer system, mappable tokens in the input string that are mappable to the output string (step 800). The process creates, by the computer system, a set of initial mappings for a set of common tokens in the mappable tokens (step 802). In step 802, the set of initial mappings maps the set of common tokens from the input string to the output string.

The process creates, by the computer system, a set of user mappings that maps the mappable tokens from the input string to the output string using a user input to the set of initial mappings (step 804). The process generates, by the computer system, program code that transforms input strings to output strings using the set of user mappings that maps the mappable tokens from the input string to the output string, wherein the program code is used to transform the input strings to output strings (step 806). The process terminates thereafter.

Figure 9:
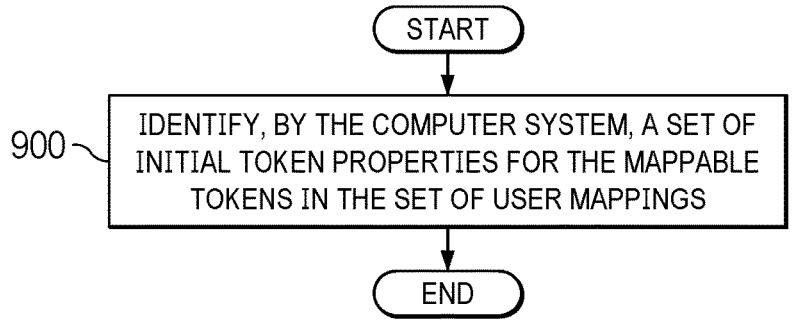
FIG. 9 is a flowchart of a process for identifying a set of initial token properties for mappable tokens in accordance with an illustrative embodiment.

Turning next to FIG. 9, a flowchart of a process for identifying a set of initial token properties for mappable tokens is depicted in accordance with an illustrative embodiment. The step in this figure is an example of an additional step that can be used within the step in the process in FIG. 8.

The process identifies, by the computer system, a set of initial token properties for the mappable tokens in the set of user mappings (step 900). The process terminates thereafter.

Figure 10:
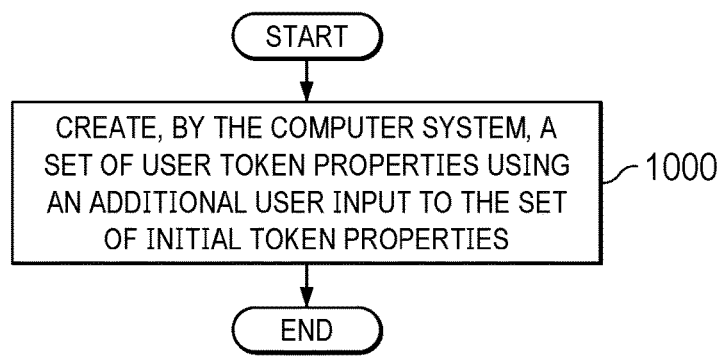
FIG. 10 is a flowchart of a process for creating a set of user token properties in accordance with an illustrative embodiment.

With reference to FIG. 10, a flowchart of a process for creating a set of user token properties is depicted in accordance with an illustrative embodiment. The step in this figure is an example of an additional step that can be used with the step in the process in FIG. 9.

The process creates, by the computer system, a set of user token properties using an additional user input to the set of initial token properties (step 1000). The process terminates thereafter.

Figure 11:
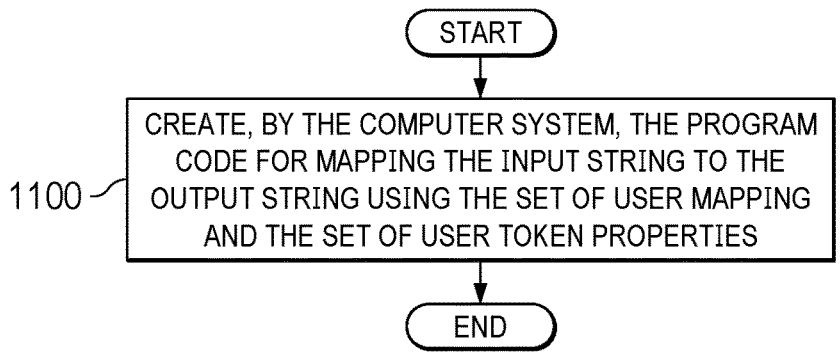
FIG. 11 is a flowchart of a process for creating a program code for mapping an input string to an output string in accordance with an illustrative embodiment.

With reference now to FIG. 11, a flowchart of a process for creating a program code for mapping an input string to an output string is depicted in accordance with an illustrative embodiment. The process illustrated in FIG. 11 is an example of one implementation for step 806 in FIG. 8.

The process creates, by the computer system, the program code for mapping the input string to the output string using the set of user mapping and the set of user token properties (step 1100). The process terminates thereafter.

Figure 12:
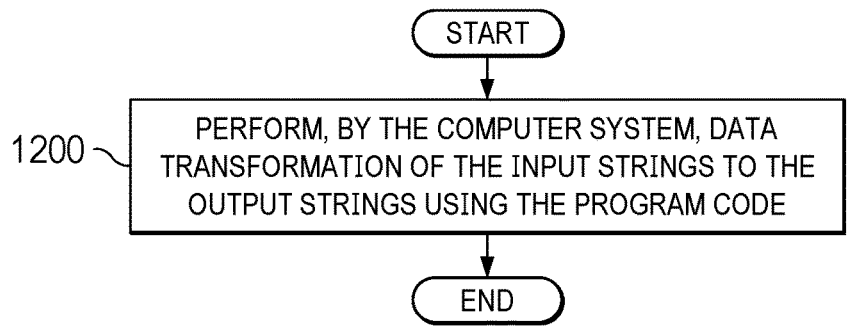
FIG. 12 is of a flowchart of a process for performing data transformation of input strings to output strings in accordance with an illustrative embodiment.

Turning next to FIG. 12, a flowchart of a process for performing data transformation of input strings to output strings is depicted in accordance with an illustrative embodiment. The step in this figure is an example of an additional step that can be used with the step in the process in FIG. 11.

The process performs, by the computer system, data transformation of the input strings to the output strings using the program code (step 1200). The process terminates thereafter.

Figure 13:
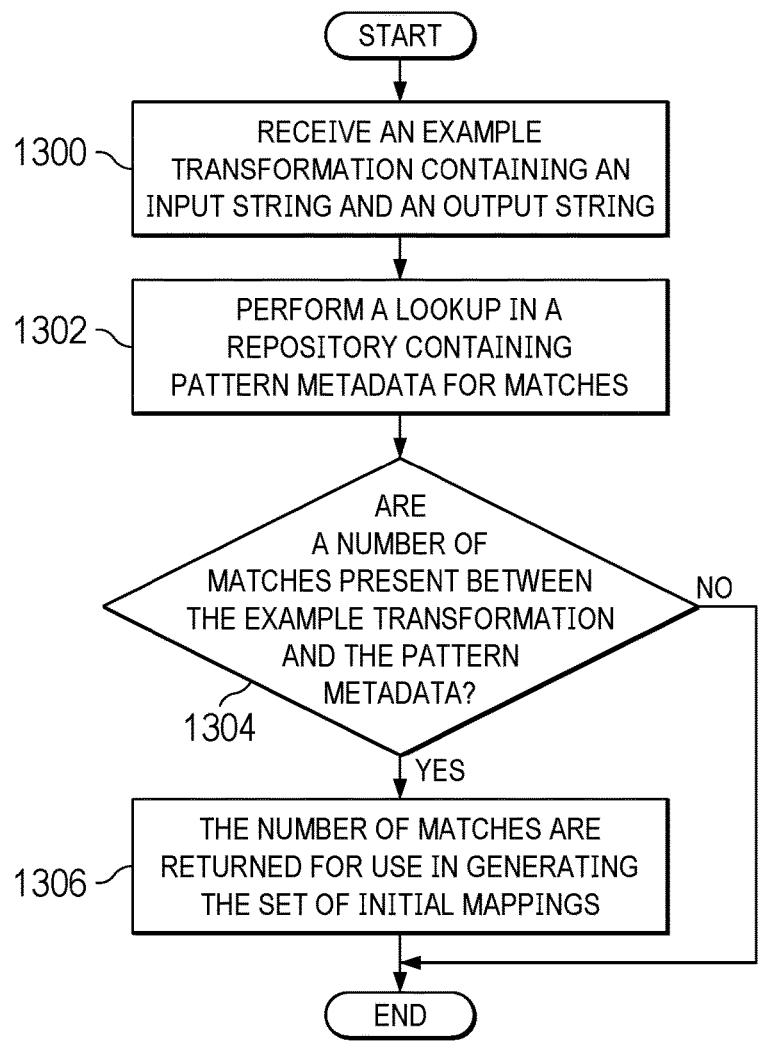
FIG. 13 is a flowchart of a process for performing data transformation of input strings to output strings in accordance with an illustrative embodiment.

With reference next to FIG. 13, a flowchart of a process for performing data transformation of input strings to output strings is depicted in accordance with an illustrative embodiment. This process can be implemented in historical transformation data lookup 312 in FIG. 3 for use by data transformation manager 214 in generating initial mappings 240 in FIG. 2. This process can be used when exact matches between tokens are absent.

The process begins by receiving an example transformation containing an input string and an output string (step 1300). The process performs a lookup in a repository containing pattern metadata for matches (step 1302). In step 1302, this lookup can be performed using metadata stored using schema 400.

A determination is made as to whether a number of matches are present between the example transformation and the pattern metadata (step 1304). If a number of matches are present, then the matches are returned for use in generating the set of initial mappings (step 1306). The process terminates thereafter. With reference again step 1304, if a number of matches are not present, the process also terminates.

With this example in FIG. 13, if the example transformation completely satisfies any node_in, edge, and node_out combinations in the different entries in the repository, the edge can be used to map a mappable token from the input string to a mappable token in the output string based on the matching of the tokens with the node_in and node_out. In other words, when a match is found for a node_in and node_out, the edge for that entry can be used in creating the initial mapping. These matches can also be used to identify token properties for the tokens that are mapped to each other. Matches to node_in, edge, and node_out can be used to confirm mappings.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
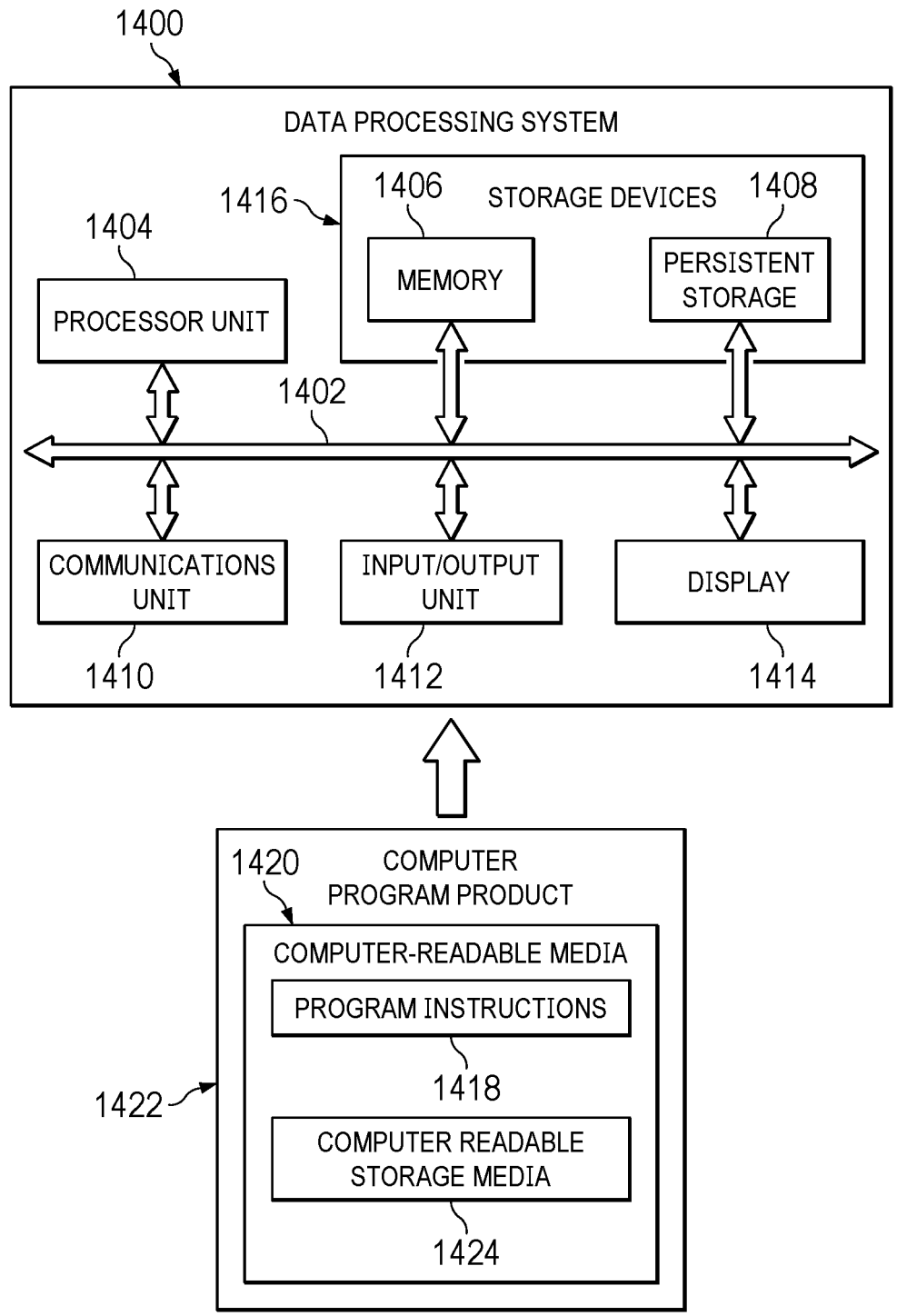
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 212 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments of the present invention provide a computer implemented method, computer system, and computer program product for transforming source data into target data. In the illustrative example, the source data is an input string with a first format and the target data is an output string with a second format. The second format is a desired format the output string.

Responsive to receiving a data transformation of an input string to an output string, a computer system identifies mappable tokens in the input string that are mappable to the output string. The computer system creates a set of initial mappings for a set of common tokens in the mappable tokens. The set of initial mappings maps the set of common tokens from the input string to the output string. The computer system creates a set of user mappings that maps the mappable tokens from the input string to the output string using a user input to the set of initial mappings. The computer system generates program code that transforms input strings to output strings using the set of user mappings that maps the mappable tokens from the input strings to the output strings. The program code is used to transform the input strings to the output strings.

Thus, the illustrative example enables generating program code to transform an input string having an input format to an output string having output format. This program code can be generated using a single example and user input to capture the desired transformation of input strings to output strings. In the illustrative example, the user is guided and provides user input during the process of generating the transformation program to map input strings to output strings such that the output strings have a desired format. Further, this process enables a user to have an understanding of the manner in which the transformation program operates. As result, the user can more easily select from different transformation programs based on knowledge about these transformation programs are created.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for transforming data, the computer implemented method comprising:
   responsive to receiving a data transformation of an input string to an output string, identifying, by a computer system, mappable tokens in the input string that are mappable to the output string,
   creating, by the computer system, a set of initial mappings for a set of common tokens in the mappable tokens, wherein the set of initial mappings maps the set of common tokens from the input string to the output string that match one another;
   creating, by the computer system, a set of user mappings that maps the mappable tokens from input string to the output string using a user input to the set of initial mappings;
   generating, by the computer system, program code that transform input strings to output strings using the set of user mappings that maps the mappable tokens from input string to the output string, wherein the program code is used to transform input strings to output strings;
   identifying, by the computer system, a set of initial token properties for the mappable tokens in the set of user mappings;
   creating, by the computer system, a set of user token properties using an additional user input to the set of initial token properties; and
   performing, by the computer system, data transformation of the input strings to the output strings using the program code, wherein generating, by the computer system, the program code for mapping the input string to the output string using the set of user mappings comprises:
   creating, by the computer system, the program code for mapping the input string to the output string using the set of user mappings and the set of user token properties.

2. The computer implemented method of claim 1, wherein the user input to the set of initial mappings is selected from one of a confirmation of the set of initial mappings and a modification to the set of initial mappings.

3. The computer implemented method of claim 1, wherein the additional user input to the set of initial token properties is selected from one of a confirmation of the set of initial token properties and a modification to the set of initial token properties.

4. A computer system comprising:
   comprising a number of processor units, wherein the number of processor units executes program instructions to:
   responsive to receiving a data transformation of an input string to an output string, identify mappable tokens in the input string that are mappable to the output string,
   create a set of initial mappings for a set of common tokens in the mappable tokens, wherein the set of initial mappings maps the set of common tokens from the input string to the output string that match one another;
   create a set of user mappings that maps the mappable tokens from input string to the output string using a user input to the set of initial mappings;
   generate, program code that transform input strings to output strings using the set of user mappings that maps the mappable tokens from input string to the output string, wherein the program code is used to transform input strings to output strings;
   identify a set of initial token properties for the mappable tokens in the set of user mappings;
   create a set of user token properties using an additional user input to the set of initial token properties; and
   perform, by the computer system, data transformation of the input strings to the output strings using the program code, wherein in generating, by the computer system, the program code for mapping the input string to the output string using the set of user mappings, wherein the number of processor units executes program instructions to:
   create the program code for mapping the input string to the output string using the set of user mappings and the set of user token properties.

5. The computer system of claim 4, wherein the user input to the set of initial mappings is selected from one of a confirmation of the set of initial mappings and a modification to the set of initial mappings.

6. The computer system of claim 4, wherein the additional user input to the set of initial token properties is selected from one of a confirmation of the set of initial token properties and a modification to the set of initial token properties.

7. A computer program product for transforming data, the computer program product comprising a computer readable storage medium having program instructions embodied therewith, the program instructions executable by a computer system to cause the computer system to perform a method of:
   responsive to receiving a data transformation of an input string to an output string, identifying, by a computer system, mappable tokens in the input string that are mappable to the output string,
   creating, by the computer system, a set of initial mappings for a set of common tokens in the mappable tokens, wherein the set of initial mappings maps the set of common tokens from the input string to the output string that match one another;

creating, by the computer system, a set of user mappings that maps the mappable tokens from input string to the output string using a user input to the set of initial mappings;

generating, by the computer system, program code that transform input strings to output strings using the set of user mappings that maps the mappable tokens from input string to the output string, wherein the program code is used to transform input strings to output strings;

identifying, by the computer system, a set of initial token properties for the mappable tokens in the set of user mappings;

creating, by the computer system, a set of user token properties using an additional user input to the set of initial token properties; and performing, by the computer system, data transformation of the input strings to the output strings using the program code, wherein generating, by the computer system, the program code for mapping the input string to the output string using the set of user mappings comprises:

creating, by the computer system, program code for mapping the input string to the output string using the set of user mappings and the set of user token properties.

8. The computer program product of claim 7, wherein the user input to the set of initial mappings is selected from one of a confirmation of the set of initial mappings and a modification to the set of initial mappings.

9. The computer program product claim 7, wherein the additional user input to the set of initial token properties is selected from one of a confirmation of the set of initial token properties and a modification to the set of initial token properties.

* * * * *